(12) United States Patent
Brooke et al.

(10) Patent No.: US 6,748,569 B1
(45) Date of Patent: *Jun. 8, 2004

(54) XML SERVER PAGES LANGUAGE

(76) Inventors: David M. Brooke, 1 Westview Rise, Hemel Hempstead, Hertfordshire (GB); Steve M. Saxon, 47 Southwold, Bracknell, Berkshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/399,451

(22) Filed: Sep. 20, 1999

(51) Int. Cl.[7] .............................................. G06F 15/00
(52) U.S. Cl. ................... 715/523; 715/522; 715/513; 707/1
(58) Field of Search .................. 715/513, 500.1, 715/522, 523; 707/1

(56) References Cited

U.S. PATENT DOCUMENTS

| | | | | |
|---|---|---|---|---|
| 6,012,098 A | * | 1/2000 | Bayeh et al. | 709/246 |
| 6,272,673 B1 | * | 8/2001 | Dale et al. | 717/100 |
| 6,424,979 B1 | * | 7/2002 | Livingston et al. | 715/511 |
| 6,446,110 B1 | * | 9/2002 | Lection et al. | 709/203 |
| 6,476,833 B1 | * | 11/2002 | Moshfeghi | 345/854 |
| 6,480,865 B1 | * | 11/2002 | Lee et al. | 707/523 |
| 6,535,896 B2 | * | 3/2003 | Britton et al. | 715/523 |
| 6,585,778 B1 | * | 7/2003 | Hind et al. | 715/513 |
| 6,589,291 B1 | * | 7/2003 | Boag et al. | 715/513 |

OTHER PUBLICATIONS

EXtensible Server Pages (XSP) Layer 1, Jun. 11, 1999, http://xml.coverpages.org/WD–xsp–19990611.html.*

XSL Transformations (XSLT), Version 1.0, W3C Working Draft Aug. 13, 1999,http://www.w3.org/1999/08/WD–xslt–199990813.*

Cocoon User Guide, http://web.archive.org/web/19991012020445/java.apache.org/cocoon/guide.html.*

Groner, Java Interactive Course, Chapter 24, Copyright 1997.*

* cited by examiner

*Primary Examiner*—Stephen S. Hong
*Assistant Examiner*—Adam Queler

(57) ABSTRACT

A method and computer program product for generating XML documents using a script language that extends the capabilities of XML. The script language includes control statements for including data content and style information from a plurality of sources. One or more scripts may be developed that includes script language control statements. A script processor processes the scripts and generates a content document and a style document. The content document specifies the content to be included in the XML document, and the style document specifies the style for displaying the content in the XML document. One set of program instructions transform the content document and the style document into an XML document. Another set of program instructions convert the XML document to an output document for a selected type of display. The script language and script processor provide facilities for gathering content and style information from a plurality of sources. Numerous scripts may be generated to override and/or extend information in one or more of the other scripts, thereby allowing a developer to customize selected portions of the output document while using shared content and style for the remaining portions of the output document.

18 Claims, 7 Drawing Sheets

FILE = inventors.xsp   /—300

```
<xsp: script base="inventor-base.xsp" xmlns:xsp="uri:xsp" xmlns:xsl="uri:xsl"
      xmlns:doc=uri:doc">
   <!-- This script extends inventor-base.xsp -->
   <!-- Over-ride contents implementation in the base script -->
   <xsp:sub name="contents">
      <!-- Ask XSP to get the list of inventors as a server-side data island
           and hold onto it for script lifetime -->
      <xsp:xml name="listofinventors" src="/xsp/data/inventors/xsp.xml" />
      <!-- Use XSP to query the data island, with a query attribute to
           retrieve only the inventors (not managers) -->
      <xsp: query src="#listofinventors" query="//inventors">
         <!-- standard XSL root rule to start stylesheet processing or
              this document fragment -->
         <xsl:template match="/">
            <!--XSL formatting statements go here-->
         </xsl:template>

<!-- XSP to call base subroutine to import the default rules -->
         <xsp:call href="#core-templates" />

<!-- XSL again to provide a special template for an inventor,
              outputting selected fields in the desired order -->
         <xsl:template match="inventor">
            <!-- XSL formatting statements go here-->
         </xsl:template>
      </xsp:query>

<!-- Use XSP to query the same data island a second time for
           managers and not inventors -->
      <xsp:query src="#listofinventors" query="//managers">
         <xsl: template match="/">
            <-- Put statements for standards XSL stylesheet
                processing for this portion of the document -->
         <xsl:template>
      </xsp:query>
   </xsp:sub>
</xsp:script>
```

*FIG. 3*

```
                    FILE = inventor - base.xsp              ┌─400
402─┐
    └<xsp:script xmlns:xsp="uri:xsp" xmlns:xsl="uri:xsl" xmlns:doc="uri:doc">
      <!-- Base script -->

<!-- Default XSP entry point -->
       ┌<xsp:sub name ="main">
404─┘        <!-- Insert any standardised output here -->
        406─┐ <!-- Then call the contents routine>
    408─┐    └<xsp:call href="#contents" />
        └</xsp:sub>

<!-- Provide a default XSP contents routine -->
       ┌<xsp:sub name="contents">
410─┘        <!-- Ask XSP to query the document -->
             <xsp:query src="/xsp/data/inventors/xsp.xml">
                 <!-- Now XSL begins - just provide a default rule -->
                 <xsl:template match="/"

....

</xsl:template>
                 <!-- Now call an XSP routine to import the default rules before
          428─┐      invoking XSL -->
              └<xsp:call href="#core-templates"
    432─┐    </xsp:query>
        └</xsp:sub>

434─┐ <!-- This XSP routine provides two XSL default rules whenever needed -->
    └<xsp:sub name-"core-templates">
             <!-- output all text nodes as is -->
             <xsl:template match="textNode()">
                     <xsl:value-of />
             </xsl:template>
             <!-- ensure XSL recursion continues in the absence of better
                    matching rules -->
             <xsl:template match="*">
                     <xsl:apply-templates />
        452─┐ </xsl:template>
454─┐   └</xsp:sub>
    └</xsp:script>
```

FIG. 4

FILE = xsp.xml

⟵ 500

```
<?xml version="1.0" encoding="iso-8859-1"?>
<inventorlist>
    <managers>
        <manager role="dir">
            <name>Gordon Ballantyne</name>
            <title>Director of EMBA Online</title>
        </manager>
        <manager role="vp">
            <name>Maurice Cowey</name>
            <title>Vice President of HSB for EMBA</title>
        </manager>
    </managers>
    <inventors>
        <inventor ID="I001">
            <name>David Brooke</name>
            <title>Internet Development Manager</title>
            <SSN/WL 08 77 96 A</SSN>
            <region>EMEA</region>
            <badgeno>64329</badgeno>
        </inventor>
        <inventor ID="I002">
            <name>Steve Saxon</name>
            <title>Technical Architect</title>
            <SSN>NH 77 71 96 B</SSN>
            <region>EMEA</region>
            <badgeno>103836</badgeno>
        </inventor>
    </inventors>
</inventorlist>
```

FIG. 5

XML SERVER PAGES LANGUAGE

BACKGROUND OF THE INVENTION

1. Field of the Invention

This invention generally relates to page display software languages for programmers on the world wide web. More specifically, this invention relates to providing uniform content information from a central location to display pages.

2. Description of the Related Art

A significant development in computer networking is the Internet, which is a sophisticated worldwide network of computer systems. A user at an individual PC (i.e., workstation) that wishes to access the Internet typically does so using a software application known as a web browser. A web browser uses a standardized interface protocol, such as HyperText Transfer Protocol (HTTP), to make a connection via the Internet to other computers known as web servers, and to receive information from the web servers that is displayed on the user's display. Information displayed to the user is typically organized into pages that are constructed using a specialized language such as Hypertext Markup Language (HTML), Extensible Markup Language (XML), and Wireless Markup Language (WML), hereinafter (markup languages). Markup languages are typically based on the Standard Generalized Markup Language (SGML) that was created with the original purpose of having one standard language that could be used to share documents among all computers, regardless of hardware and operating system configurations. To this end, markup language files use a standard set of code tags embedded in their text that describes the elements of a document. The web browser interprets the code tags so that each computer having its own unique hardware and software capabilities is able to display the document while preserving the original format of the document. Each document typically resides in a separate file on the server.

For companies doing world-wide business over the Internet, web pages are translated into the appropriate language and stored as hard-coded HTML and/or active server pages (ASP). Further, business units in different countries or regions often target specific products and/or services for that particular area, requiring customized information on the web pages. Updating the pages may quickly entail an overwhelming amount of overhead for the business organization. Additional overhead is incurred with the proliferation of specialized mark-up languages having unique syntax for different types of computer systems, such as WML for portable, wireless, telephones and personal communication systems. In many instances, the format or style of the page may be common across servers, especially when a company strives for a unified appearance across their pages, but data on the page may be unique to a specific server.

There are a number of different web browsers available, each supporting their own extensions to markup languages such as HTML. Thus, a document written for one browser may not be interpreted as intended on another browser if it does not support the same extensions. In many situations, software developers are forced to create unique documents for each browsers, or to include logic in the markup language that bypasses or executes certain portions of code, depending on which browsers are being supported. This adds another layer of complexity to developing and updating these documents.

XML was designed to meet the requirements of large-scale web content providers for industry-specific markup (i.e., encoded descriptions of a document's storage layout and logical structure), vendor-neutral data exchange, media-independent publishing, one-on-one marketing, workflow management in collaborative authoring environments, and the processing of web documents by intelligent clients. XML is also used in certain metadata applications. XML supports European, Middle Eastern, African, and Asian languages, and all conforming processors support the Unicode character set encodings.

It is therefore desirable to provide a mechanism for using XML that allows customized web pages to share format and other content/behavior information while providing capability to store data in structured, but flexible collections associated with owners. It is also desirable for the markup language to allow users to recombine and re-use data on many different pages, and to draw on different sources for data. An inheritance mechanism to allow the grouping of pages into classes, and to allow sub-classes of pages to be derived is also desired. It is also desirable for such a system to support standards provided in XML.

In the prior art, there are a variety of systems that provide limited content management capability. Some commercially available content management systems such as Vignette, StoryServer and Inso Dynabase, typically use templates or page components that are dynamically populated from system query language (SQL) databases and recombined into pages using pre-defined templates. These systems generally fit well with highly structured sites having many identically formatted pages, such as a news site, however, the template structures are generally fixed and not flexible. Further, in these systems, the data storage paradigm is based upon filling named slots in the templates, which does not lend itself to a flexible data format that prioritizes the expression of data and its relationships. The template model for such systems is typically based on either Java, or a scripting language such as VBScript or Tcl/Tk, and limited support is typically provided for XML as a data type.

Another variety of systems that provide limited content management capability are internet application servers such as ColdFusion. These application servers are primarily designed to support development of interactive applications. Most of the site template structures are hard-coded as server scripts, often using a mixture of standard HTML tags and proprietary tags that are pre-processed on the server. Each script is independent of the others; there is no inheritance mechanism. Even though the scripts are based on tags, the scripts are not well-formed XML, but rather customized HTML, and the separation of form and data is limited. Further, use of XML in these systems is limited to complete source data files.

Web-enabled object/XML databases such as ObjectStore/eXcelon, Poet, etc., provide a platform for high-performance application development around a flexible repository, but provide limited development tools. The data modeling capabilities are flexible and well-suited to free-form web content, however, and there is no high-level scripting language to provide a framework for managing content.

Traditional non-web content management systems such as Interleaf, ArborText, and TexCel are designed for generic, media-neutral content management, and are frequently SGML-based, therefore leading to a natural evolution towards XML. These systems are typically deployed for maintaining major documentation projects. The output of these systems is normally customized for a particular customer, and may be delivered online, on compact disc, or in print. These systems are designed to assemble explicit documents, however, and do not include capabilities for providing data-driven, script-aided document delivery.

One other system for populating pages includes using ASP and SQL with content selection rules supported by personalization/recommendation software components. This is a relatively simple approach to content management, however, most of the site template structures are hard-coded in HTML, and thus there is no inheritance mechanism. Additionally, most of the data is embedded in the pages, and pages are personalized by populating pre-defined slots with targeted data. Mass customization is possible, but there is little flexibility.

SUMMARY OF THE INVENTION

A method and computer program product for generating XML documents using a script language that extends the capabilities of XML. The script language includes control statements for including data content and style information from a plurality of sources. One or more scripts may be developed that includes script language control statements. A script processor processes the scripts and generates a content document and a style document. The content document specifies the content to be included in the XML document, and the style document specifies the style for displaying the content in the XML document. One set of program instructions transform the content document and the style document into an XML document. Another set of program instructions convert the XML document to an output document for a selected type of display. The script language and script processor provide facilities for gathering content and style information from a plurality of sources. Numerous scripts may be generated to override and/or extend information in one or more of the other scripts, thereby allowing a developer to customize selected portions of the output document while using shared content and style for the remaining portions of the output document.

BRIEF DESCRIPTION OF THE DRAWINGS

FIG. 3 is an example of a source file for a user script according to the present invention.

FIG. 4 is an example of a source file for a base script according to the present invention.

FIG. 5 is an example of a source file for a data island according to the present invention.

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

Overview of Preliminary Concepts and Definitions

While the Internet is used herein as an example of how the present invention is utilized, it is important to recognize that the present invention is also applicable to other information networks that utilize documents with content represented in a markup language. For those who are not familiar with XML, the Internet, the world-wide web, web servers, and web browsers, a brief overview of these concepts is presented here.

Figure 1:
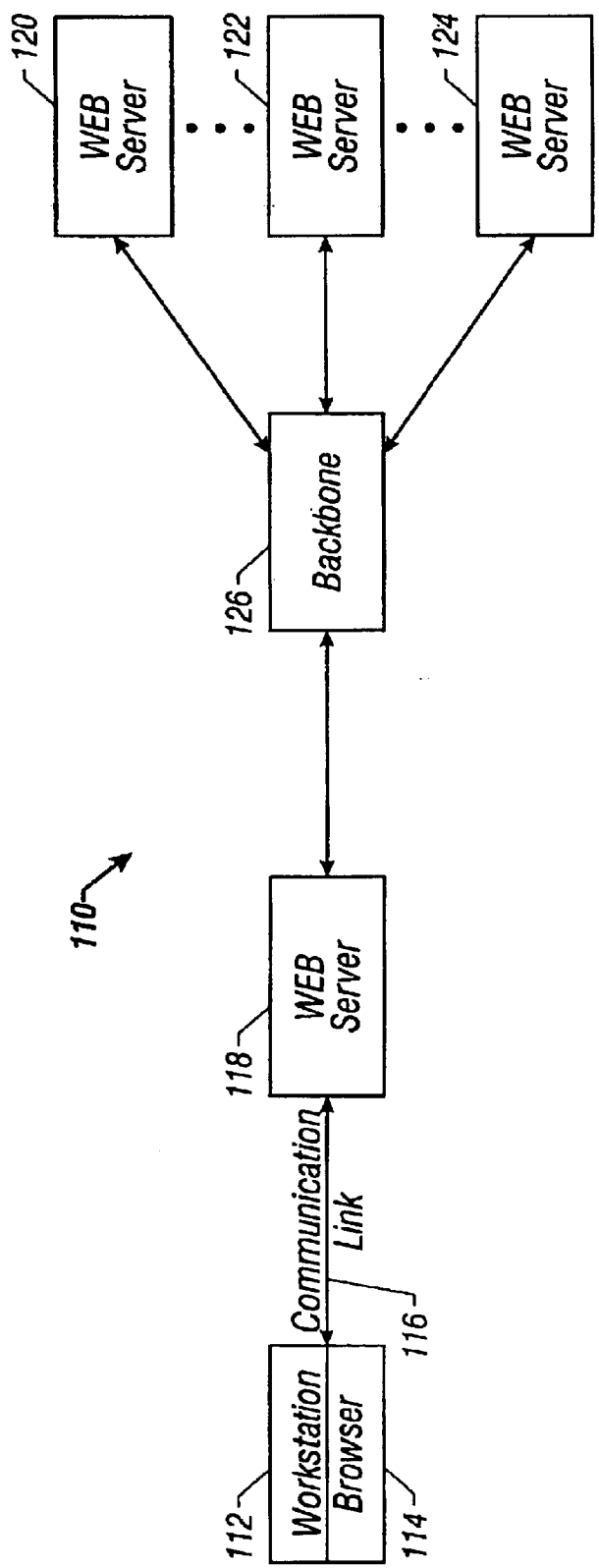
FIG. 1 is a block diagram of a computerized information network with which the present invention may be utilized.

An example of a typical Internet connection found in the prior art is shown in FIG. 1. A user that wishes to access information on the Internet typically has a computer workstation 112, also referred to as "the client workstation", that executes an application program known as a web browser 114. Workstation 112 establishes a communication link 116 with web server 118 such as a dial-up wired connection with a modem, a direct link such as a T1 or ISDN line, a wireless connection through a cellular or satellite network, or a local data transport system such as Ethernet or token ring over a local area network. When the user enters a request for information by entering commands in web browser 114, workstation 112 sends a request for information, such as a search for documents pertaining to a specified topic, or a specific web page to web server 118. Each web server 118, 120, 122, 124 on the Internet has a known address which the user must supply to the web browser 114 in order to connect to the appropriate web server 118, 120, 122, or 124. If the information is available on the user's web server 118, a central link such as backbone 126 allows web servers 118, 120, 122, 124 to communicate with one another to supply the requested information. Because web servers 118, 120, 122, 124 can contain more than one web page, the user will also specify in the address which particular web page he wants to view. The address, also known as a universal resource locator (URL), of a home page on a server is a series of numbers that indicate the server and the location of the page on the server, analogous to a post office address. For simplicity, a domain name system was developed that allows users to specify servers and documents using names instead of numbers. A URL may further specify a particular page in a group of pages belonging to a content provider by including additional information at the end of a domain name.

Figure 1A:
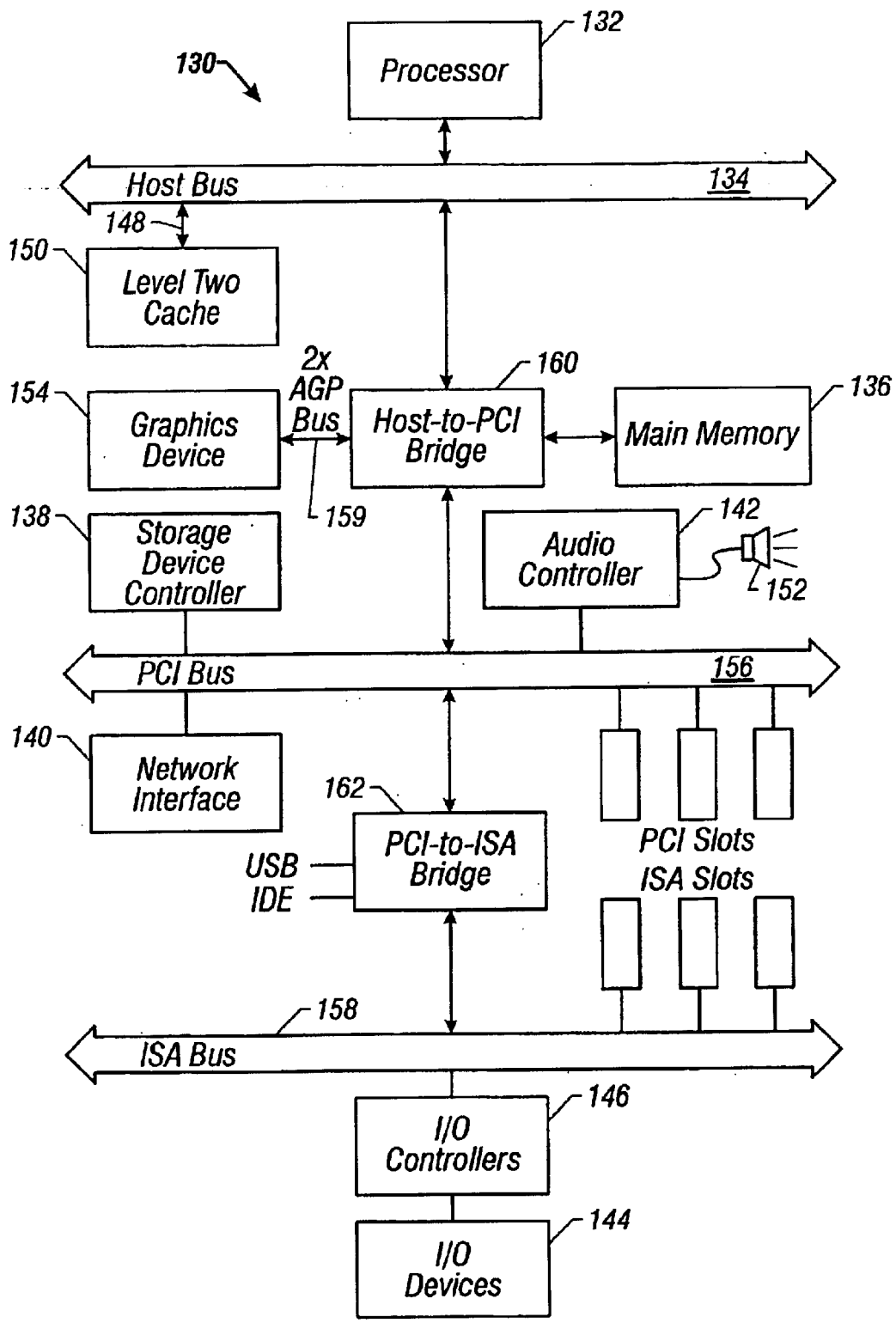
FIG. 1a is a block diagram of a computer system with which the present invention may be utilized.

The web servers 118, 120, 122, 124 execute a web server application program which monitors requests, services requests for the information on that particular web server, and transmits the information to the user's workstation 112. Workstation 112 and/or web servers 116 are computer systems, such as computer system 130 as shown in FIG. 1a. Computer system 130 includes central processing unit (CPU) 132 connected by host bus 134 to various components including main memory 136, storage device controller 138, network interface 140, audio and video controllers 142, and input/output devices 144 connected via input/output (I/O) controllers 146. Those skilled in the art will appreciate that this system encompasses all types of computer systems including, for example, mainframes, minicomputers, workstations, servers, personal computers, Internet terminals, network appliances, notebooks, palm tops, personal digital assistants, and embedded systems. Typically computer system 130 also includes cache memory 150 to facilitate quicker access between processor 132 and main memory 136. I/O peripheral devices often include speaker systems 152, graphics devices 154, and other I/O devices 144 such as display monitors, keyboards, mouse-type input devices, floppy and hard disk drives, DVD drives, CD-ROM drives, and printers. Many computer systems also include network capability, terminal devices, modems, televisions, sound devices, voice recognition devices, electronic pen devices, and mass storage devices such as tape drives. The number of devices available to add to personal computer systems continues to grow, however computer system 130 may include fewer components than shown in FIG. 1a and described herein.

The peripheral devices usually communicate with processor 132 over one or more buses 134, 156, 158, with the buses communicating with each other through the use of one or more bridges 160, 162. Computer system 130 may be one of many workstations or servers connected to a network such as a local area network (LAN), a wide area network (WAN), or a global information network such as the Internet through network interface 140.

CPU 132 can be constructed from one or more microprocessors and/or integrated circuits. Main memory 136 stores programs and data that CPU 132 may access. When computer system 130 starts up, an operating system program is loaded into main memory 136. The operating system manages the resources of computer system 130, such as CPU 132, audio controller 142, storage device controller 138, network interface 140, I/O controllers 146, and host bus 134. The operating system reads one or more configuration files to determine the hardware and software resources connected to computer system 130.

Storage device controller 138 allows computer system 130 to retrieve and store data from mass storage devices such as magnetic disks (hard disks, diskettes), and optical disks (DVD and CD-ROM).

One skilled in the art will recognize that the foregoing components and devices are used as examples for sake of conceptual clarity and that various configuration modifications are common. For example, audio controller 142 is connected to PCI bus 156 in FIG. 1a, but may be connected to the ISA bus 138 or reside on the motherboard (not shown) in alternative embodiments. As further example, although computer system 130 is shown to contain only a single main CPU 132 and a single system bus 134, those skilled in the art will appreciate that the present invention may be practiced using a computer system that has multiple CPUs 132 and/or multiple busses 134. In addition, the interfaces that are used in the preferred embodiment may include separate, fully programmed microprocessors that are used to off-load computationally intensive processing from CPU 132, or may include input/output (I/O) adapters to perform similar functions. Further, PCI bus 156 is used as an exemplar of any input-output devices attached to any I/O bus; AGP bus 159 is used as an exemplar of any graphics bus; graphics device 154 is used as an exemplar of any graphics controller; and host-to-PCI bridge 160 and PCI-to-ISA bridge 162 are used as exemplars of any type of bridge. Consequently, as used herein the specific exemplars set forth in FIG. 1a are intended to be representative of their more general classes. In general, use of any specific exemplar herein is also intended to be representative of its class and the non-inclusion of such specific devices in the foregoing list should not be taken as indicating that limitation is desired.

A web page is primarily visual data that is intended to be displayed on the display monitor of the user's workstation 112. When web server 118 receives a web page request, it will transmit a document, generally written in a markup language such as HTML or XML, across communication link 116 to the requesting web browser 114. Web browser 114 interprets the markup language and outputs the web page to the monitor of user workstation 112. This web page displayed on the user's display may contain text, graphics, and links (which are addresses of other web pages.) These other web pages (i.e., those represented by links) may be on the same or on different web servers 116. The user can go to these other web pages by clicking on the links using a mouse or other pointing device. This entire system of web pages with links to other web pages on other servers across the world comprises the world wide web.

Style sheet mechanisms available in markup languages enable style elements to be consistent across web pages that are related to one another (e.g., web pages belonging to a web site of a particular corporation). For example, HTML uses cascading style sheets (CSS), SGML uses document style semantics and specification language (DSSSL), and XML uses extensible style language (XSL). XSL is a language for expressing style sheets in XML, i.e., to express how the structured content of an XML file should be styled, laid out, and paginated onto some presentation medium such as a window in a web browser or a set of physical pages in a book, report, pamphlet, or memo. XSL was developed because XML offers greater data display possibilities than HTML. XML lets authors mark up data with author-defined elements (opening and closing pairs of tags) that specify the nature of the data. This allows the developer to clearly organize customized data structures. The data elements can be displayed with consistent formatting in different places on one document or across a series of documents. XML inserts the datum in the appropriate location, and XSL allows for more complex formatting than style sheet mechanisms associated with other markup languages.

XML enables users to create unique tags that identify their information in more meaningful ways than simply applying a basic set of markup language tags to all documents. To accomplish this, XML provides a namespace feature, which allows the user to specify addresses to provide a unique context to tags and attributes.

An XSL style sheet processor accepts a document or data in XML and an XSL style sheet, and produces the presentation of that XML source content as specified by the style sheet. The presentation process includes transforming a source tree into a result tree (also known as tree transformation), and interpreting the result tree to produce a formatted presentation on a display or other media. By separating the style sheet and the data, style or formatting aspects may be modified without modifying data that is being rendered, and vice versa.

XSL transformation (XSLT) is a language for tree transformation which associates patterns with templates. A pattern is matched against elements in the source tree. A template is instantiated for a particular source element to create part of the result tree. When a template is instantiated, each instruction is executed and replaced by the result tree fragment that it creates. In constructing the result tree, elements from the source tree can be filtered and reordered, and arbitrary structure can be added. XSLT uses XML namespaces to distinguish elements that are instructions to the XSLT processor from elements that specify literal result tree structure.

A schema specifies the structure of an XML document and constraints on its content. XML defines rules for defining markup languages having tags, while a schema is a formal specification of the grammar for one markup language. A schema is useful for validating the document content and for describing the grammar of the language. The schema defines the elements that can appear within the document and the attributes that can be associated with an element. XML schemas are extensible and software developers are free to add their own elements and attributes to XML schema documents. It defines whether an element is empty or can include text. The schema can also define default values for attributes.

XML includes a feature known as the Document Object Model (DOM) which is an application programming interface (API) for HTML and XML documents. The DOM defines the logical structure of documents and the way a document is accessed and manipulated. In the DOM, programmers can build documents, navigate their structure, and add, modify, or delete elements and content. Many objects found in an HTML or XML document can be accessed, changed, deleted, or added using the DOM. Documents are modeled using objects, and the model encompasses not only the structure of a document, but also the behavior of a document and the objects of which it is composed. As an object model, the DOM identifies the interfaces and objects used to represent and manipulate a document, the semantics of these interfaces and objects including both behavior and attributes, and the relationships and collaborations among these interfaces and objects.

Description

Figure 2:
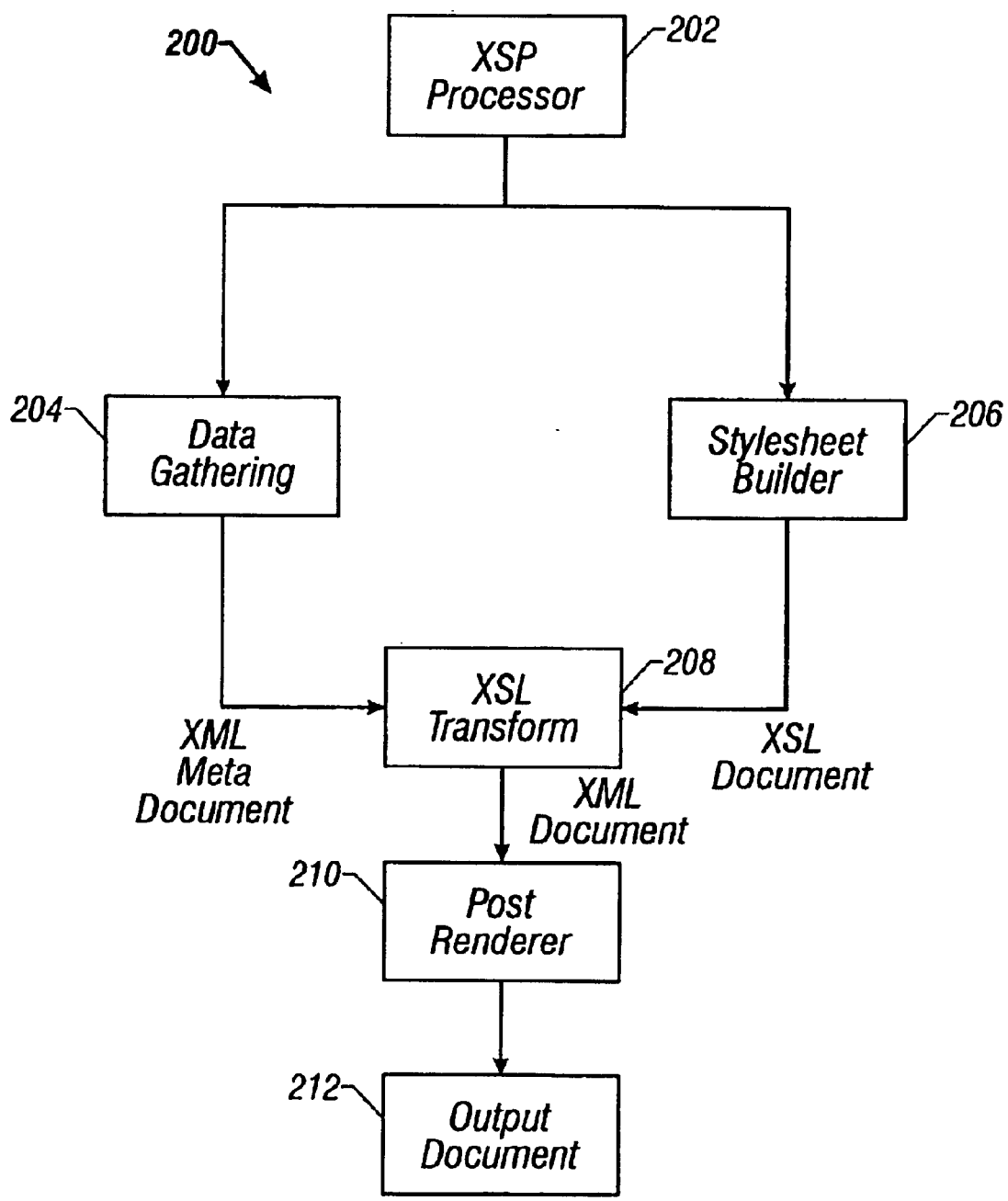
FIG. 2 is a block diagram of a device for generating documents according to the present invention.

FIG. 2 shows a block diagram of server pages processing apparatus 200 for generating and processing XML and XSL documents using XML server pages language (XSP) in accordance with the present invention. The present invention includes the XSP script language and XSP processor 202 that interprets scripts written in XSP. XSP processor 202 resides on web server 116 (FIG. 1), and on other web servers, as required. One way to invoke XSP processor 202 is dynamically, through an online mechanization wherein a user submits one or more XSP scripts from client workstation 112 (FIG. 1) to XSP processor 202 through an application program interface (API) on web server 116. Examples of commonly known interfaces to web server 116 that may be used include the Internet Services Application Programming Interface (ISAPI) and Common Gateway Interface (CGI). The resulting page is then transmitted back to client workstation 112 and is displayed or output to a selected target device, such as browser 114 (FIG. 1). Another way to invoke XSP processor 202 is statically, where a developer submits one or more XSP scripts to XSP processor 202 directly on server 116. The page or pages that result from server pages processing apparatus 200 are stored in server 116 and may be accessed by a URL request from client workstation 112.

An example of XSP script 300 in accordance with the present invention is shown in FIG. 3. In the present invention, a software developer generates XSP script 300 manually or by using a software-implemented tool that automatically or semi-automatically generates XSP script 300. The tool for generating XSP scripts may include a user interface, such as an interactive, graphical user interface, or a static interface that receives user input through one or more data files.

XSP scripts, such as XSP script 300, are used to generate classes of web pages. In one embodiment, XSP script 300 is initiated in XSP processor 202 by a user or another program requesting the URL of the script, such as the URL http://server/xsp/inventors.xsp l=en target=ie5, where, in this example, the source for the script is stored in a file named inventors.xsp in the xsp directory on computer system server. The request also includes parameters that provide information pertaining to, among other things, the XML and XSL documents that will be generated during data gathering process 204 and style sheet builder process 206 shown in FIG. 2. For example, the parameter l=en (language=english) provides information on which language will be used to display the resulting page. Another example is the parameter target=ie5 that identifies the browser that will be used so that the documents can be tailored to the unique features and extensions of the particular browser. Other parameters may be implemented as required.

Another alternative for initiating the XSP script 300 in XSP processor 202 is by using a common object module (COM) interface to XSP processor 202, as known in the art.

An XSP script is a document written in XSP and XML that specifies one or more XML documents as input to XSP processor 202. The output of server pages processing apparatus 200 is an XML object that may be a well-formed markup language document that is ready to be input to a browser, or it may be expressed in another format that is ready for use in a data-interchange process with another system, or for formatting and delivery to an HTML or non-HTML client.

XSP script 300 is interpreted by XSP processor 202 as a set of subroutines that create XML structures in a result tree. The XML structures may be created by querying and transforming one or more XML data sources, or by direct inline coding of desired output as a template.

In one embodiment of XSP, all core functionality to support the structure of the result tree, whether it is an XML electronic data interchange (EDI) message, or a markup language document derived from an XML document, is implemented in low level "base" scripts. "User" scripts provide extensions and/or overwrite low level base scripts. The XML data sets referenced in user scripts determine the final result tree. This feature is known as the inheritance mechanism and it results in a very small number of compact scripts being able to support very large websites and a wide variety of actual document formats. Inheritance is an object oriented design feature which lets the user define some shared functionality, then override it in specific cases. Thus, a page may be divided into separate building blocks, with each block being generated by different XSP scripts. When a change is required in one block, only the affected scripts must be changed and the other blocks remain the same.

The inheritance mechanism also allows configuration control of page formats. For example, developers in different regions may be given access to blocks containing information that is unique to their region, such as information presented in a particular language, or different products that may be available in one region but not others. This allows software developers to change the information that is unique to them, while still maintaining commonality with scripts which generate the blocks that are common with other regions.

In accordance with the present invention, XSP scripts may also include capabilities for creating and accessing named and scoped variables, exercising flow control, instantiating and accessing COM objects, and creating XML data islands with script scope on a web server.

XSP scripts share control structure syntax with XSL, but place the XSP control structure syntax in a different XML namespace to clarify whether XSP processor 202 executes the control structure, or whether the control structure is handled in another tier of server pages processing apparatus 200. In the example of XSP script 300 in FIG. 3, XSP statement 302 includes namespace parameters that indicate the name of the base script and the location of files containing information for generating a content file and a style sheet in data gathering process 204 and style sheet builder process 206, respectively. In the example shown in line 302 in FIG. 3, the namespace parameters, denoted by xmlns, include namespaces for XSP documents (xsp="uri:xsp"), XSL documents (xsl="uri:xsl"), and XML default documents (doc="uri:doc").

Note that in this embodiment, open carets "<", open carets with a slash "</", and close carets ">" are used to denote control statements. The XSP scripting language of the present invention includes several different XSP control statements that are denoted by tags that are defined using the schema feature of XML. The XSP control statement tags are recognized by XSP processor 202. For example, XSP script 300 begins with "<xsp:script>" in line 302 and ends with "</xsp:script>" in line 398 to denote the start and end of the script. In one embodiment, the syntax for the <xsp:script> control statement is:

```
<xsp:script [base="base-script"] [scope="default-scope"]>
    script-statements
</xsp:script>
``` where:
    base-script is the name of the script from which this one inherits;
    script-statements is the value to be assigned to the variable or property; and
    default-scope is the value to be assigned to the variable or property.

Every XSP script has <xsp:script> as its root element. XSP scripts can optionally have a base script defined. The base script is used to define which script this one inherits from. Scope can normally be ignored. Setting it to protected will mean that <xsp:call> will only see subroutines within this script if the call is being made from the same script, or one derived from it. If a call is made to a script without a specific subroutine being specified, a <xsp:sub> called main is searched for, first in this script, then in its base if any.

An example of an implementation of control statement <xsp:script> is shown in line 302 in user XSP script 300, which instantiates a base script using base="inventor-base.xsp", where inventor-base.xsp is the name of the base script. The content implemented when the base script is instantiated at the beginning of execution of XSP script 300 is over-ridden and/or extended by subroutine "contents" shown in lines 304 through 306 in "user" XSP script 300.

An example of base script inventor-base.xsp, instantiated in example XSP script.300, is shown in FIG. 4. Base script 400 includes a main subroutine in lines 404 through 408, where standardized and default content are implemented. Lines 410 through 432 include a routine that provides default XSP contents, and lines 434 through 452 include XSL default rules.

Another example of an XSP control statement <xsp:sub> for declaring the start of a new subroutine is shown in line 304 in FIG. 3. The name of the subroutine, in this example "contents", is included as a parameter. The "contents" subroutine is included in lines 304 through 396 and overrides the "contents" subroutine in base script 400. In one embodiment, the syntax is:

```
<xsp:sub name="subroutine-name" [scope="scope-type"]>
</xsp:sub>
``` where:
    subroutine-name is the name of the subroutine.
    scope-type is an optional scope declaration. If set to "protected", the subroutine will only be visible to callers in the current script and ones derived from it. <xsp:sub> is used to define a subroutine within a script and is analogous to sub in Visual Basic and VBScript or function in JavaScript. Scope can normally be ignored. Setting it to "protected" will mean that <xsp:call> will only see subroutines within this script if the call is being made from the same script, or one derived from it. If scope is not defined, the default scope defined in the <xsp:script> is used (if defined).

Line 308 in XSP script 300 includes XSP control statement <xsp:query> to execute an XQL query, such as querying data island xsp.xml shown in FIG. 5. The <xsp:query> statement can be used to obtain a piece of XML from another document or an embedded data island. The source data can be queried to reduce the scope of the data returned. It can also be transformed using XSL patterns, which are either passed inline within the <xsp:query> tags, or by reference to an XSL document in the transform attribute.

In example XSP script 300 in FIG. 3, query control statement 308 includes query attributes src="#listofinventors" and query="//inventors" to retrieve a list containing only the inventors from data island listofinventors. Note that the query attributes may specify other information available in data island.

In one embodiment, the syntax for the <xsp:query> statement is:

```
<xsp:query src="source" [ query="xql-query" ] [ transform="transform-doc" ]
    [ hasstrings="string-bool" ] [ hasfilter="filter-bool" ] >
    [ transform-statements ]
</xsp:query>
``` where:
    source is the source of the data. This can be a URL or a data island reference.
    xql-query is optional and are the statements to be performed if the enclosing condition is true.
    transform-doc is optional and are the statements to be performed if the enclosing condition is true.
    string-bool is optional and is set to true if the document being queried contains XSP formulas which need to be expanded.
    filter-bool is optional and is set to true if the document being queried contains filter attributes that should be parsed to obtain the actual working document to be queried.
    transform-statements are optional and are the statements to be performed if the enclosing condition is true.

XSP script 300 may also access routines directly from another script, using the other script as a subroutine library.

Another XSP control statement, <xsp:xml>, is used to define a data island. An example of this statement is shown in line 306 in FIG. 3 which includes query attributes name="listofinventors" and src="/xsp/data/inventors/xsp.xml" to retrieve a list of inventors from data island xsp.xml on directory/data/inventors as specified as parameters in the control statement in line 306. In one embodiment, the syntax for the <xsp:xml> control statement is:

```
<xsp:xml name="name" [src="source"] [scope="scope-type"] >
<[ xml-data ]>
</xsp:xml>
``` where:
    name is the name that will be used to subsequently access this data island.

source (optional) is the source of the data. If this parameter is not supplied, the inline xml-data is used to populate the data island.

scope-type (optional) is the scope declaration—either "local", "parent" or "global". The default is "local".

xml-data (optional) is the XML data used to populate the data island.

The <xsp:xml> statement provides a way to hold on to a piece of XML data so that it can be subsequently processed and queried using <xsp:query>. This feature is particularly useful where the same document needs to be queried a number of times, as it means the document will only be loaded once. It is also useful where the document to be queried does not exist on disk—it may have been directly created inline using normal XML tags, or returned from another query (using <xsp:query> or from xsp:xdb. An example of an XML script source file for xsp.xml data island 500 is shown in FIG. 5.

Many other types of XSP control statements may be implemented in the present invention. For example, an <xsp:assign> statement is used to assign a variable, or modify properties of an object. An <xsp:assign> statement may also be used for dynamic naming, where the name of the variable being assigned can be based on a variable name. This can be used to implement features such as arrays, for example, <xsp:assign name="column$(col)" value="This is column $(col)"/>.

Another XSP control statement implemented in the present invention is the <xsp:call> statement which is used to make a call into another subroutine, as shown for example, in lines 406 and 428 in FIG. 4. In one embodiment, the syntax is:

<xsp:call href="subroutine"/> where subroutine is the reference to the subroutine to be called.

The subroutine parameter is in the general form [filename][#sub-name][?parameters]. If the filename is not specified, the current script and then its base scripts are searched for the subroutine. If the sub-name is not specified, the entry point subroutine called "main" is called. Parameters can be passed. In one embodiment, if a function is called in the base script, the filename should be set to ". . . ". This is particularly useful where the user has overridden an <xsp:sub> to extend the basic functionality, then wishes to call up to the default implementation.

Another XSP control statement implemented in the present invention is the <xsp:choose> statement which is used to choose between a number of actions based on whether or not one of the supplied conditions are true. In one embodiment, the syntax is:

```
<xsp:choose>
    <xsp:when test="condition">
        conditional-statements </xsp:when>
        :
    <xsp:otherwise>
        conditional-statements </xsp:otherwise>
</xsp:choose>
``` where:
condition is the condition to be evaluated.
conditional-statements is the statements to be performed if the enclosing condition is true.

Other XSP control statements impemented in the present invention include the <xsp:comment> statement for placing comments in the output meta-document; the <xsp:copy-string> statement for copying a formatted string from a stringtable; the <xsp:for> statement for enumerating the values in a collection; the <xsp:if> statement for performing an action if a given condition is met; the <xsp:request> statement for making a parameterised HTTP request for XML data; and the <xsp:xdb> statement for enumerating all or part of an XDB database. The XDB database facility includes an image, a link, and a definition database. While performing the enumeration, whenever a link image, definition or variant node is found, the node's data block is expanded. The <xsp:xdb> control statement is further explained in co-pending U.S. patent application Ser. No. 09/399,506, entitled "Database Facility for XML Server Pages Language", which was filed on Sep. 20, 1999 and is assigned to the same assignee as the present application, and is hereby incorporated by reference.

Referring back to FIG. 2, XSP processor 202 generates a first XSP script document that includes commands specifying XML resources containing the content desired for the page. The first XSP script document is output to data gathering process 204. Data gathering process 204 pulls the content from the sources specified in the first XSP script, and creates an XML meta-document for the message and content of the page. This XML meta-document is independent of the XML style sheet and is not targeted for any specific language or format. The XML meta-document expresses metaphors instead of code for directly generating the items on the page. For example, the script

```
<doc:root>
    <doc:collapsing list>
        <doc:list item 1>
            :<doc:title> title 1/> xml_resources
            :<doc:description>
        </doc:list item 1>
    </doc:collapsing list>
</doc:root>
``` may be used in the meta-document to represent the text and graphics for a collapsible list, instead of the actual code statements required in a typical mark-up language document for generating the text and graphics. Data gathering process 204 is capable of retrieving information from a variety of sources and allows developers in a particular region to specify the most relevant information to display on a given page. Developers may even provide some of the content that is unique to their area by utilizing user scripts, where allowed, while maintaining common content and format among all users using base scripts for the other portions of the page.

XSP processor 202 also generates a second document which includes a style sheet script for the page. Style sheet builder process 206 receives the style sheet script from XSP processor 202 and retrieves all of the documents specified in the style sheet script for formatting the content in the meta-document. The output of style sheet builder process 206 is an XSL document containing rules to format the meta-document.

The XSL document and the XML meta-document are input to XSL transform 208 which searches the hierarchy of modules specified in both the meta-document and the style sheet and uses the inheritance mechanism to determine which modules to utilize. A template is instantiated for the source elements specified in the module to create the result tree. When a template is instantiated, each instruction is executed and replaced by the result tree fragment that it creates.

The result tree fragments generated in XSL transform 208 are output to an XML document and sent to post renderer 210. Post renderer 210 converts the XML document to the document format required by the device or application software that will be used to display output document 212. Such document format may be one or more of many different formats including HTML, word processor formats, and WML, based on the target specified when XSP script 300 is initiated in XSP processor 202.

Figure 6:
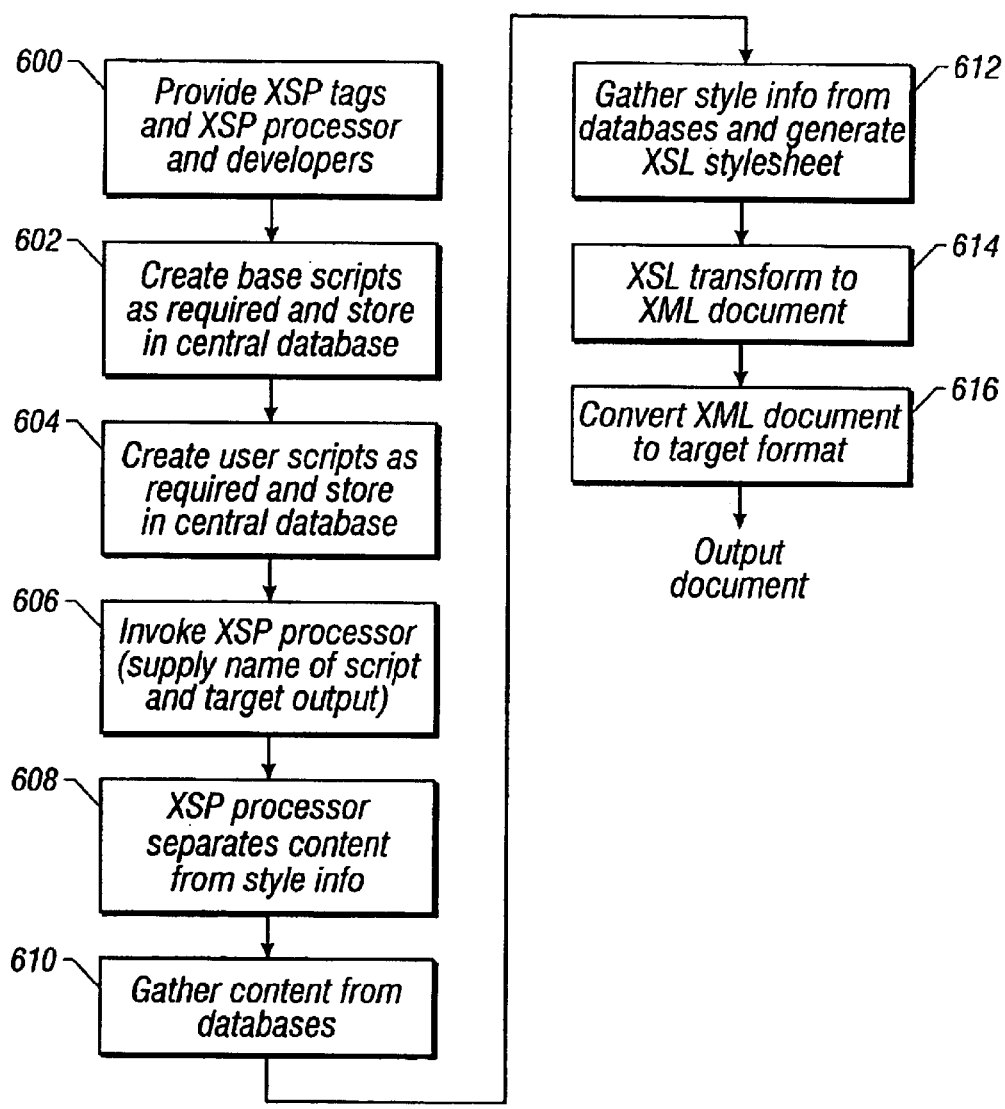
FIG. 6 is a flowchart for generating documents according to the present invention.

The process of generating an output document for a target device using XSP scripts is summarized in the flowchart in FIG. 6. In process 600, an XSP processor and XSP tags that are to be recognized by the XSP processor are generated and made available to developers. The XSP tags are used to identify statements in a script as XSP statements, and may be included in their own unique namespace. In process 602, a developer creates base scripts and stores them in a central database that is accessible by all servers that provide content for the organization. Where required, process 604 allows developers to create and store user scripts that override or extend the base script. Both user scripts and base scripts may include lines using the inherency mechanism associated with XSP tags to override or extend information in a previous script.

To generate a display document from the scripts, the XSP processor is invoked with the top level script as input in process 606. The XSP processor separates the content specifications from the style specifications in process 608. Process 610 uses the content specification to gather modules for generating the content for various portions in a meta-document. Similarly, process 612 uses the style specification to gather modules for generating the format for various portions of the output document, and generates a corresponding XSL style sheet. The style sheet and meta-document are transformed to an XML document in process 614 and the XML document is converted in process 616 from XML to the appropriate target format, whether it is HTML, WML, word processor format, or another document format.

While the present invention is described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of signal bearing media include: recordable type media such as floppy disks and CD-ROM, transmission type media such as digital and analog communications links, as well as other media storage and distribution systems.

The present invention thus provides a control language that may be included in scripts with XSL and XML statements. XSP script processor 202 associated with the present invention interprets the control language and performs substitutions for and additions to content and style information in the script. The present invention thus complies with XML vocabulary and utilizes standardized XML technology by supplementing and coordinating XSL and XML schema and namespace capabilities.

The present invention advantageously allows web page developers and other content providers to switch from editing numerous markup language files to implement a change to creating data forms using scripts that retrieve data and style information from common sources where possible. The present invention provides facilities for coordinating content and style development, and relieves developers from having to manually edit numerous files when a change is desired in either format or content, since the change may be made in a central databases that are referenced by XSP script 300 or base script 400 and retrieved by data gathering process 204 and style sheet builder process 206. Developers responsible for providing content and styles that are unique to their individual environments may be given access to combine their own unique information and format where desired, and use shared information otherwise. Further, even when unique information is required, the present invention provides facilities (i.e., user scripts) that allow the information to be located in one location and used by all developers requiring access to it. The sharing of content and style information also facilitates presentation of up-to-date information in consistent formats.

While the invention has been described with respect to the embodiments and variations set forth above, these embodiments and variations are illustrative and the invention is not to be considered limited in scope to these embodiments and variations. For example, additional XSP control statements may be implement in addition to or instead of those described herein. Further, the XSP control statements described herein may have different names and/or syntax. Accordingly, various other embodiments and modifications and improvements not described herein may be within the spirit and scope of the present invention, as defined by the following claims.

What is claimed is:

1. A method of generating an XML document in a computer system, wherein the computer system includes a script processor operable to interpret a script language, the computer system further including a script language, the script language including control statements for including data content and style information from a plurality of data sources, the method comprising:

generating a first script having at least one script language control statement;

processing the first script in the script processor to generate a first document specifying content to be included in the XML document; and processing the first script in the script processor to generate a second document specifying the style of the content in the XML document;

generating a second script having at least one script language control statement; and processing the second script in the script processor to further generate the first document specifying the content to be included in the XML document, wherein the content specified by the second script overrides at least a portion of the content specified by the first script.

2. A method of generating an XML document in a computer system, wherein the computer system includes a script processor operable to interpret a script language, the computer system further including a script language, the script language including control statements for including data content and style information from a plurality of data sources, the method comprising:

generating a first script having at least one script language control statement;

processing the first script in the script processor to generate a first document specifying content to be included in the XML document; and processing the first script in the script processor to generate a second document specifying the style of the content in the XML document;

generating a second script having at least one script language control statement; and processing the second script in the script processor to further generate the second document specifying the style to be included in the XML document, wherein the style specified by the second script overrides at least a portion of the style specified by the first script.

3. A method of generating an XML document in a computer system, wherein the computer system includes a script processor operable to interpret a script language, the computer system further including a script language, the script language including control statements for including data content and style information from a plurality of data sources, the method comprising:

generating a first script having at least one script language control statement;

processing the first script in the script processor to generate a first document specifying content to be included in the XML document; and processing the first script in the script processor to generate a second document specifying the style of the content in the XML document;

generating a second script having at least one script language control statement; and processing the second script in the script processor to further generate the first document specifying the content to be included in the XML document, wherein the content specified by the second script is an extension to the content specified by the first script.

4. A method of generating an XML document in a computer system, wherein the computer system includes a script processor operable to interpret a script language, the computer system further including a script language, the script language including control statements for including data content and style information from a plurality of data sources, the method comprising:

generating a first script having at least one script language control statement;

processing the first script in the script processor to generate a first document specifying content to be included in the XML document; and processing the first script in the script processor to generate a second document specifying the style of the content in the XML document;

generating a second script having at least one script language control statement; and processing the second script in the script processor to further generate the second document specifying the style to be included in the XML document, wherein the style specified by the second script is an extension to the style specified by the first script.

5. A method of generating an XML document in a computer system, wherein the computer system includes a script processor operable to interpret a script language, the computer system further including a script language, the script language including control statements for including data content and style information from a plurality of data sources, the method comprising:

generating a first script having at least one script language control statement;

processing the first script in the script processor to generate a first document specifying content to be included in the XML document; and processing the first script in the script processor to generate a second document specifying the style of the content in the XML document;

wherein the computer system is operable to access a plurality of databases, the method further comprising:

generating a second script having at least one script language control statement; and processing the second script in the script processor to further generate the first document specifying the content to be included in the XML document, wherein the content specified by the second script is in a different database than the content specified by the first script.

6. A method of generating an XML document in a computer system, wherein the computer system includes a script processor operable to interpret a script language, the computer system further including a script language, the script language including control statements for including data content and style information from a plurality of data sources, the method comprising:

generating a first script having at least one script language control statement;

processing the first script in the script processor to generate a first document specifying content to be included in the XML document; and processing the first script in the script processor to generate a second document specifying the style of the content in the XML document;

wherein the computer system is operable to access a plurality of databases, the method further comprising:

generating a second script having at least one script language control statement; and processing the second script in the script processor to further generate the second document specifying the style to be included in the XML document, wherein the style specified by the second script is in a different database than the style specified by the first script.

7. A computer program product stored on a computer for generating XML documents using a script language, the script language having control statements that are executable by a computer system for including data content and style information from a plurality of sources, the computer program product comprising:

a first script having at least one script language control statement; and a script processor being operable to process the first script to generate a content document, wherein the content document specifies content to be included in the XML document, the script processor being further operable to generate a style document, the style document specifying the style of the XML document;

a second script having at least one script language control statement, the script processor being further operable to process the second script to generate the content document, wherein the content specified by the second script overrides at least a portion of the content specified by the first script.

8. A computer program product stored on a computer for generating XML documents using a script language, the script language having control statements that are executable by a computer system for including data content and style information from a plurality of sources, the computer program product comprising:

a first script having at least one script language control statement; and a script processor being operable to process the first script to generate a content document, wherein the content document specifies content to be included in the XML document, the script processor being further operable to generate a style document, the style document specifying the style of the XML document;

a second script having at least one script language control statement, the script processor being further operable to process the second script to generate the style document, wherein the style specified by the second script overrides at least a portion of the style specified by the first script.

9. A computer program product stored on a computer for generating XML documents using a script language, the script language having control statements that are executable by a computer system for including data content and style information from a plurality of sources, the computer program product comprising:

a first script having at least one script language control statement; and a script processor being operable to process the first script to generate a content document, wherein the content document specifies content to be included in the XML document, the script processor being further operable to generate a style document, the style document specifying the style of the XML document;

a second script having at least one script language control statement, the script processor being further operable to process the second script to generate the content document, wherein the content specified by the second script is an extension to the content specified by the first script.

10. A computer program product stored on a computer for generating XML documents using a script language, the script language having control statements that are executable by a computer system for including data content and style information from a plurality of sources, the computer program product comprising:

a first script having at least one script language control statement; and a script processor being operable to process the first script to generate a content document, wherein the content document specifies content to be included in the XML document, the script processor being further operable to generate a style document, the style document specifying the style of the XML document;

a second script having at least one script language control statement, the script processor being further operable to process the second script to generate the style document, wherein the style specified by the second script is an extension to the style specified by the first script.

11. A computer program product stored on a computer for generating XML documents using a script language, the script language having control statements that are executable by a computer system for including data content and style information from a plurality of sources, the computer program product comprising:

a first script having at least one script language control statement; and a script processor being operable to process the first script to generate a content document, wherein the content document specifies content to be included in the XML document, the script processor being further operable to generate a style document, the style document specifying the style of the XML document;

a second script having at least one script language control statement, wherein the script processor is operable to access a plurality of databases to further generate the content document, and the content specified by the second script is in a different database than the content specified by the first script.

12. A computer program product stored on a computer for generating XML documents using a script language, the script language having control statements that are executable by a computer system for including data content and style information from a plurality of sources, the computer program product comprising:

a first script having at least one script language control statement; and a script processor being operable to process the first script to generate a content document, wherein the content document specifies content to be included in the XML document, the script processor being further operable to generate a style document, the style document specifying the style of the XML document;

a second script having at least one script language control statement, wherein the script processor is operable to access a plurality of databases to further generate the style document, and the style specified by the second script is in a different database than the style specified by the first script.

13. A computer system comprising:

a processor;

a nonvolatile memory coupled to the processor;

a data bus connected between the processor and the nonvolatile memory; a first script generated using a script language, the script language having control statements for including data content and style information from a plurality of sources, the first script including at least one script language control statement; and a script processor operable with the processor to process the first script to generate a content document, wherein the content document specifies content to be included in an XML document, the script processor being further operable to generate a style document, the style document specifying the style of the XML document; and a second script having at least one script language control statement, the script processor being further operable with the processor to process the second script to generate the content document, wherein the content specified by the second script overrides at least a portion of the content specified by the first script.

14. A computer system comprising:

a processor;

a nonvolatile memory coupled to the processor;

a data bus connected between the processor and the nonvolatile memory; a first script generated using a script language, the script language having control statements for including data content and style information from a plurality of sources, the first script including at least one script language control statement; and a script processor operable with the processor to process the first script to generate a content document, wherein the content document specifies content to be included in an XML document, the script processor being further operable to generate a style document, the style document specifying the style of the XML document; and a second script having at least one script language control statement, the script processor being further operable with the processor to process the second script to generate the style document, wherein the style specified by the second script overrides at least a portion of the style specified by the first script.

15. A computer system comprising:

a processor;

a nonvolatile memory coupled to the processor;

a data bus connected between the processor and the nonvolatile memory; a first script generated using a script language, the script language having control statements for including data content and style information from a plurality of sources, the first script including at least one script language control statement; and a script processor operable with the processor to process the first script to generate a content document, wherein the content document specifies content to be included in an XML document, the script processor being further operable to generate a style document, the style document specifying the style of the XML document; and a second script having at least one script language control statement, the script processor being further operable with the processor to process the second script to generate the content document, wherein the content specified by the second script is an extension to the content specified by the first script.

16. A computer system comprising:

a processor;

a nonvolatile memory coupled to the processor;

a data bus connected between the processor and the nonvolatile memory; a first script generated using a script language, the script language having control statements for including data content and style information from a plurality of sources, the first script including at least one script language control statement; and a script processor operable with the processor to process the first script to generate a content document, wherein the content document specifies content to be included in an XML document, the script processor being further operable to generate a style document, the style document specifying the style of the XML document; and a second script having at least one script language control statement, the script processor being further operable with the processor to process the second script to generate the style document, wherein the style specified by the second script is an extension to the style specified by the first script.

17. A computer system comprising:

a processor;

a nonvolatile memory coupled to the processor;

a data bus connected between the processor and the nonvolatile memory; a first script generated using a script language, the script language having control statements for including data content and style information from a plurality of sources, the first script including at least one script language control statement; and a script processor operable with the processor to process the first script to generate a content document, wherein the content document specifies content to be included in an XML document, the script processor being further operable to generate a style document, the style document specifying the style of the XML document; and a second script having at least one script language control statement, wherein the script processor is operable with the processor to access a plurality of databases to further generate the content document, and the content specified by the second script is in a different database than the content specified by the first script.

18. A computer system comprising:

a processor;

a nonvolatile memory coupled to the processor;

a data bus connected between the processor and the nonvolatile memory; a first script generated using a script language, the script language having control statements for including data content and style information from a plurality of sources, the first script including at least one script language control statement; and a script processor operable with the processor to process the first script to generate a content document, wherein the content document specifies content to be included in an XML document, the script processor being further operable to generate a style document, the style document specifying the style of the XML document; and a second script having at least one script language control statement, wherein the script processor is operable with the processor to access a plurality of databases to further generate the style document, and the style specified by the second script is in a different database than the style specified by the first script.

* * * * *